Figure 1:
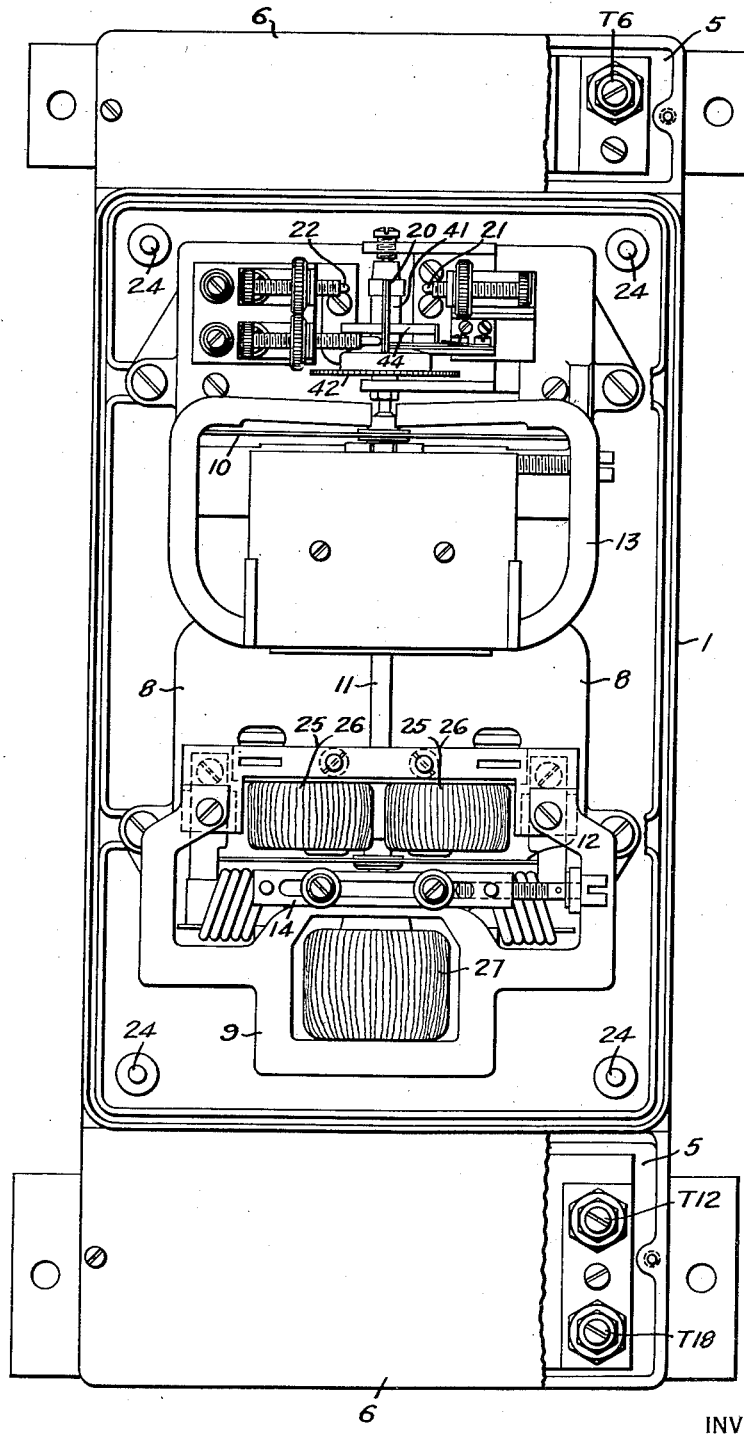

Jan. 3, 1933.    J. S. PARSONS    1,893,179
RELAY FOR NETWORK DISTRIBUTION SYSTEMS
Filed Jan. 18, 1929    6 Sheets-Sheet 1

INVENTOR
John S. Parsons.
BY
ATTORNEY

Jan. 3, 1933.  J. S. PARSONS  1,893,179
RELAY FOR NETWORK DISTRIBUTION SYSTEMS
Filed Jan. 18, 1929  6 Sheets-Sheet 4

INVENTOR
John S. Parsons.
BY
ATTORNEY

Jan. 3, 1933. J. S. PARSONS 1,893,179
RELAY FOR NETWORK DISTRIBUTION SYSTEMS
Filed Jan. 18, 1929 6 Sheets-Sheet 5

INVENTOR
John S. Parsons.
BY
Wesley S. Carr
ATTORNEY

Jan. 3, 1933. J. S. PARSONS 1,893,179
RELAY FOR NETWORK DISTRIBUTION SYSTEMS
Filed Jan. 18, 1929  6 Sheets-Sheet 6

INVENTOR
John S. Parsons.
BY
ATTORNEY

Patented Jan. 3, 1933

1,893,179

UNITED STATES PATENT OFFICE

JOHN S. PARSONS, OF EAST ORANGE, NEW JERSEY, ASSIGNOR TO WESTINGHOUSE ELECTRIC & MANUFACTURING COMPANY, A CORPORATION OF PENNSYLVANIA

RELAY FOR NETWORK DISTRIBUTION SYSTEMS

Application filed January 18, 1929. Serial No. 333,490.

This invention relates to relay apparatus for low-voltage alternating-current distribution networks, and particularly to the construction of such relays.

The principal objects of this invention are as follows:—

To provide a polyphase or plural-element network relay for the control of a network switch or circuit interrupter or breaker.

To provide a network relay having a plurality of magnets controlling a common shaft and having a single-pole double-throw contact member controlled by the common shaft.

To provide, in a network relay, a meter or the like, a terminal construction having a high degree of accessibility for facilitating alteration in the electrical connections to the relay or meter.

To provide a simple, safe and convenient means for simultaneously effecting the mechanical and electrical connection of one electrical device, such as a relay or the like, to another electrical device, such as a network switch, terminal block or the like.

To provide means for permitting the connection and disconnection of one electrical device to and from another electrical device without disturbing the lead connections of the devices.

To provide, in a network relay or the like, an improved reverse-current adjusting means.

A low-voltage distribution system of the type here involved, usually comprises an interconnected mesh or network for supplying light and power and a plurality of high-tension sources for feeding energy to the network through suitable step-down transformers. Circuit interrupters, usually termed network switches, are disposed in the feeders between the transformers and the network and are controlled by network relays, with which the present invention is specifically concerned.

The arrangement of the system and the construction of the network relays is usually such that the relays are actuated to operate the respective circuit-interrupters or network switches upon a reversal of power in the respective feeders, and, after operation of the switch, the relay itself, or, in conjunction with other means, may operate to close the switch when, and only when, the voltage conditions across the open contacts of the switch are proper.

In practicing my invention, I provide a network relay for a polyphase distribution system comprising a plurality of electromagnetic elements energized from the respective phases of the system and induction disc armatures adapted to be rotated by said magnetic elements; said armatures being secured to a common shaft for controlling double-throw single-pole contact means adapted to complete suitable circuits for controlling the operation of the network circuit interrupter.

The relay, in accordance with my invention, is provided with an improved terminal construction which facilitates the removal and replacement of the relay from the system, and an improved mechanical reverse-current adjusting means which avoids the necessity for electrical adjusting means, as heretofore employed.

Figure 2:
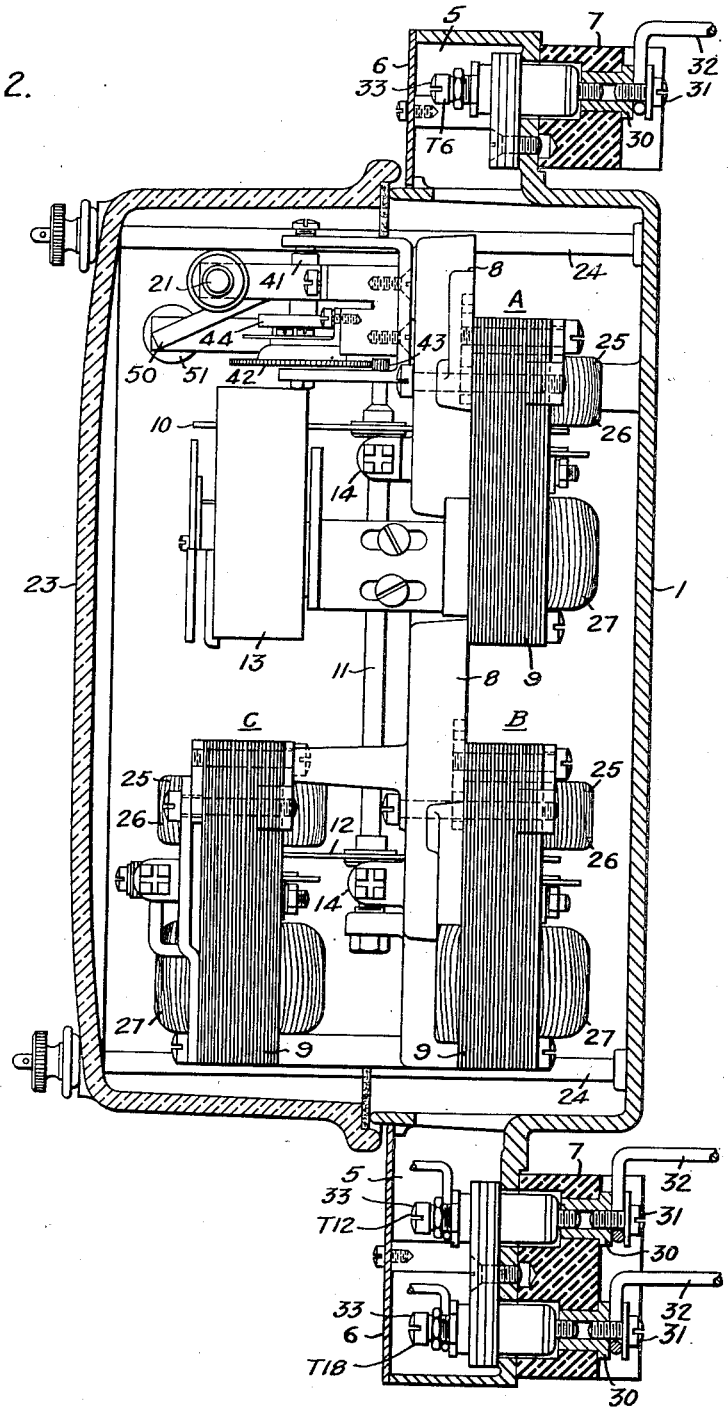
Figure 3:
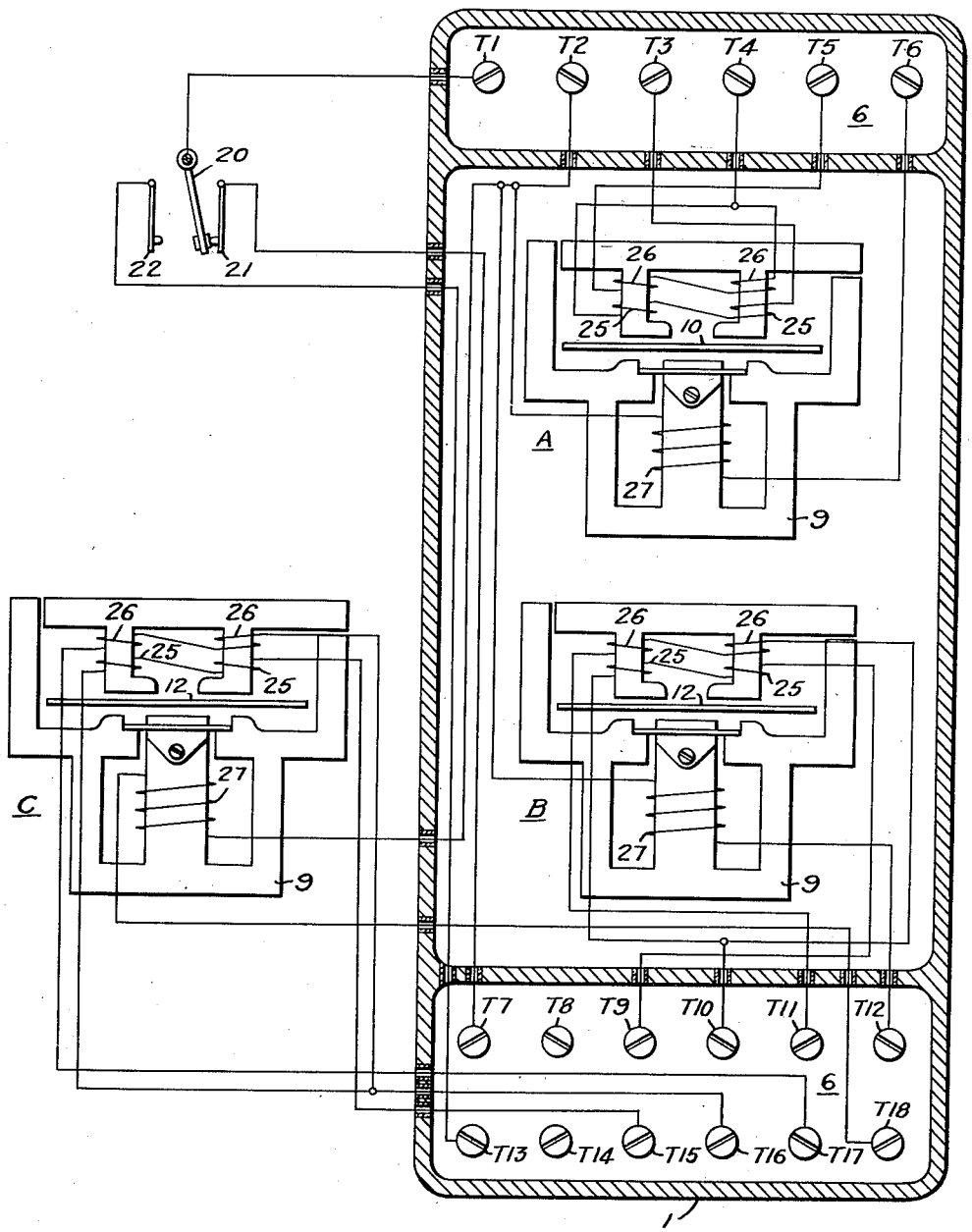
Figure 4:
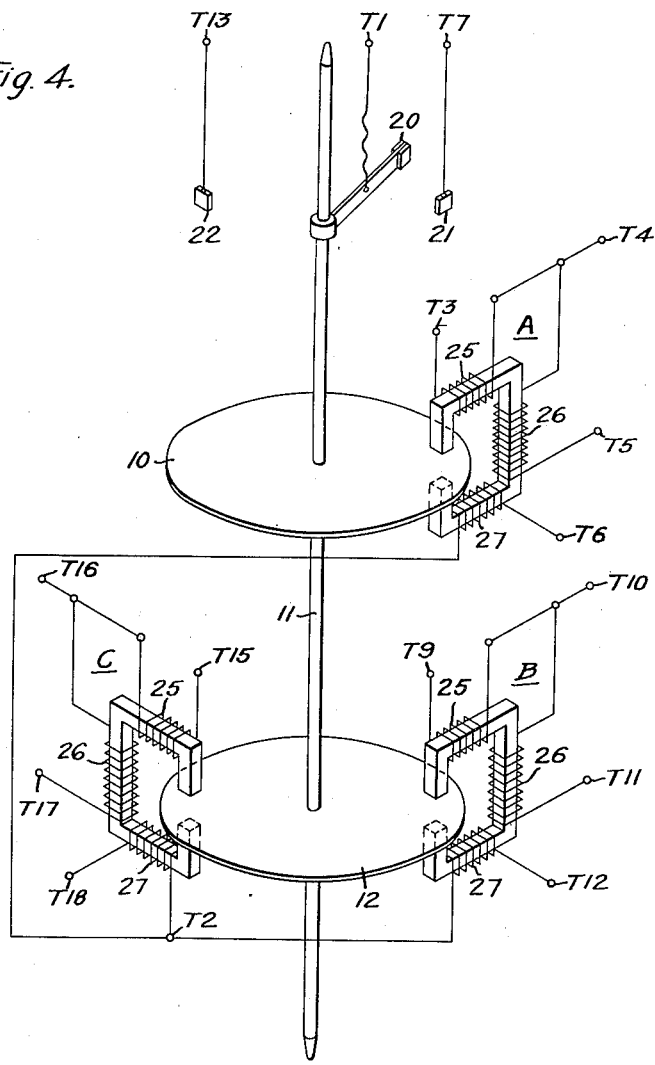
Figure 5:
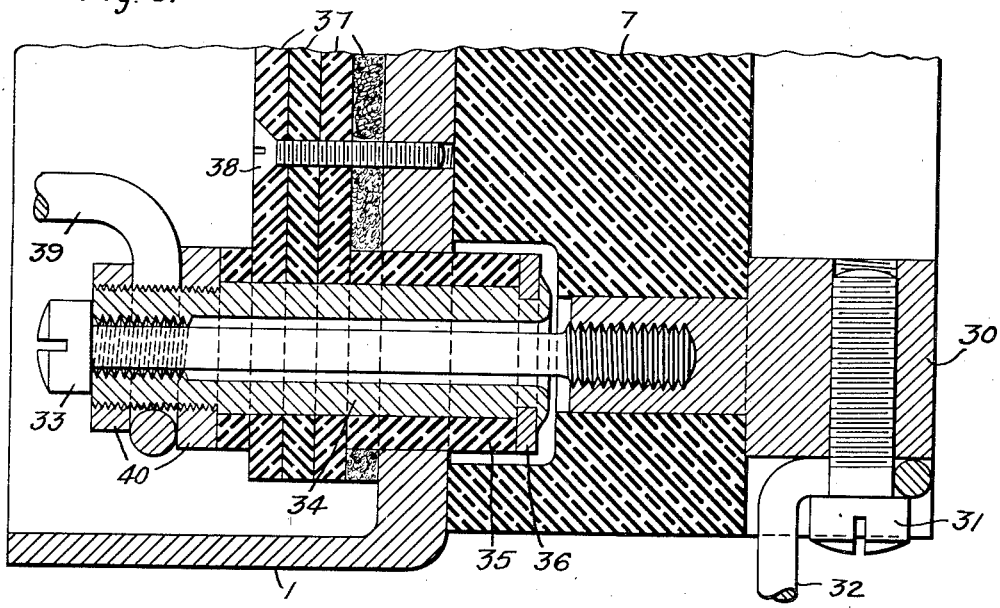
Figure 6:
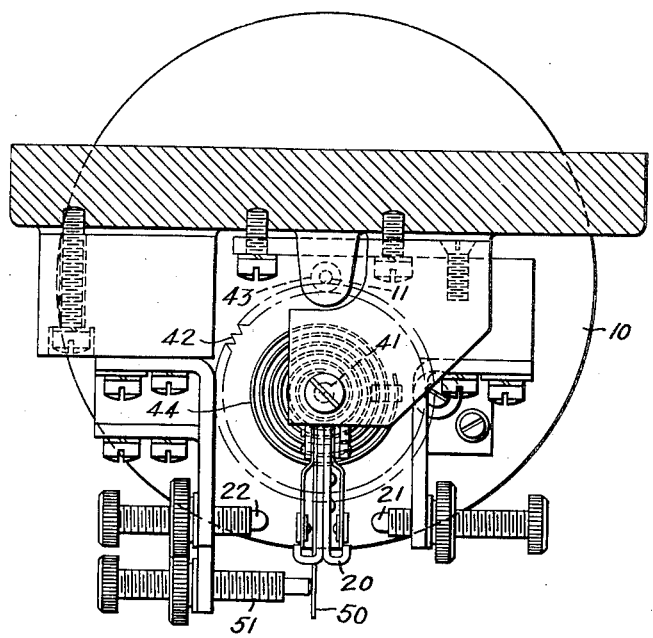
Figure 7:
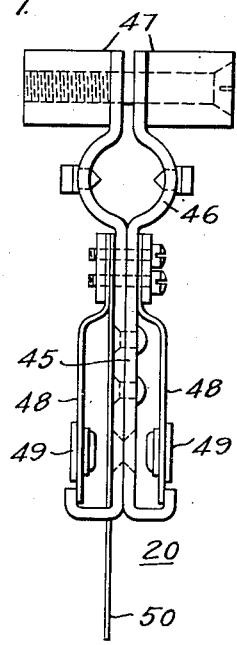
Figure 8:
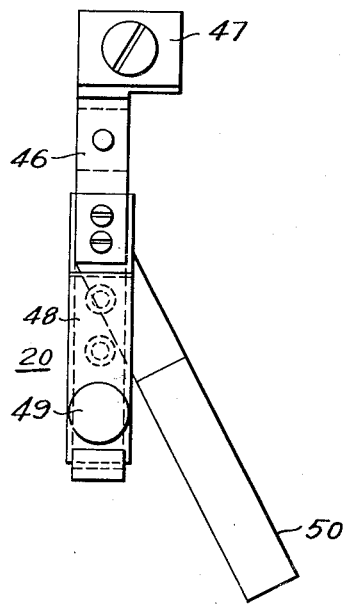
Figure 9:
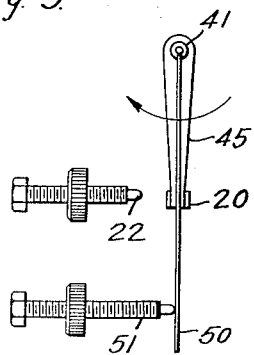
Figure 10:
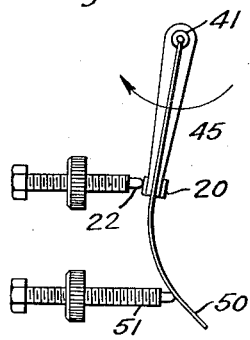

In the drawings:

Figure 1 is a view, in front elevation, of a polyphase network relay constructed in accordance with my invention, Fig. 2 is a view, in side elevation, of the construction shown in Fig. 1, portions of the relay being shown in vertical section, Fig. 3 is a wiring diagram showing the internal electrical connections of the relay, Fig. 4 is a schematic diagram showing the operating mechanism of the relay, Fig. 5 is a detail view of the improved terminal construction embodied in my invention, Fig. 6 is a plan view of the operating mechanism of the relay, showing the reverse-current-adjustment means, Figs. 7 and 8 are views, in front and side elevation, respectively, of the moving portion of the reverse-current-adjustment means, Figs. 9 and 10 are detail views showing various positions of the reverse-current-adjustment means.

Referring more particularly to the drawings, in Figs. 1 and 2 is illustrated a general assembly of the relay of my invention which may be called a polyphase network relay or, more specifically, a three-phase, three-element relay having the synchronizing functions and the reverse-power functions of three separate single-phase elements combined in one casing.

A base portion 1 is provided for mounting the relay parts and includes two terminal chambers 5, one located at the top of the base portion and having terminals T—1 to T—6, inclusive, disposed therein, the other chamber located at the bottom of the base portion enclosing the terminals T—7 to T—18, inclusive. Cover plates 6 may be utilized to cover the terminal chambers 5, as shown.

Terminal blocks 7 are secured to a suitable support, such as the network circuit-interrupter assembly (not shown), and embody means for accomplishing the double function of supporting the relay and effecting the electrical connections thereto. These functions are accomplished by means of terminal screws which extend through the terminals T—1 to T—18 and engage threaded apertures in conducting blocks or plugs imbedded in the terminal blocks 7, as hereinafter described in detail.

A frame 8 is mounted within the base 1 and is adapted to support the relay-operating elements and contact means in operative positions.

The relay-operating mechanism comprises three electromagnetic elements A, B and C adapted to be energized, respectively, from the three phases of a three-phase system. Each of the elements has a phasing winding, a voltage winding and a current winding mounted upon laminated cores 9, in a usual manner.

The element A cooperates with an induction disc armature 10 secured to a rotatable shaft 11, and the elements B and C cooperate with a disc armature 12 also secured to the shaft 11. Suitable bearings, secured to the frame 8 and engaging the respective ends of the shaft 11, may be provided. It is apparent, therefore, that the rotation of the shaft 11 is controlled jointly and severally by the magnetic elements A, B and C.

A permanent magnet 13, adjustably secured to the mounting frame 8, cooperates with the upper disc 10 to damp the movement of the shaft 11 in the usual manner.

The over-voltage adjusting means of the elements comprises plates 14 of non-magnetic material, preferably copper, which are adjustably mounted above the voltage-winding pole of the core 9 of each element. These plates are, in effect, adjustable shunts and operate to predetermine the amount of phasing voltage necessary to cause the operation of the relay. The shunts operate on the principle of the ordinary shade-coil and are similar to the means described in my copending application Serial No. 39,947, filed June 27, 1925 and assigned to the Westinghouse Electric & Manufacturing Company.

Relay contact means are disposed above the relay mechanism and comprise, in the present embodiment, a contact 20 operated by the relay shaft 11, through suitable gearing, to selectively engage stationary adjustable contacts 21 and 22. When the contact 20 engages the contact 21, a closing circuit is established for the associated network interrupter, and, when contact 20 engages stationary contact 22, a circuit is completed for tripping the interrupter.

Associated with the contact means is an adjustment for the reverse-current sensitivity, which is described hereinafter in detail.

A cover 23, of glass, in the present embodiment, may be secured to the peripheral edge of the base portion 1 by any suitable means, such as the studs 24, secured to the base projecting through apertures in the cover and engaged by thumb-nuts or the like.

Each of the magnetic elements A, B and C comprises three windings, namely, a current winding 25, a phasing winding 26 and a voltage winding 27, which energize the respective magnetic circuits in accordance with the conditions of the circuit to which the network relay is connected.

Referring more particularly to Fig. 3, the current winding 25 of the magnet A is connected to the terminals T—3 and T—4, whereas, the current windings 25 of the magnets B and C are connected to the terminals T—9, T—10 and T—15, T—16, respectively. These terminals are adapted to be connected normally to current transformers connected in the secondary mains of an alternating-current distribution system between the network interrupter and the transformer bank. The windings 25 are, therefore, adapted to be energized in accordance with the current flowing between a distribution transformer and the network to which it is connected.

The phasing windings 26 of the magnets A, B and C, respectively, are connected to the terminals T—4, T—5; T—10, T—11; and T—16 and T—17. These terminals are adapted to be connected to the corresponding phases of the system to bridge the main contacts of the open network interrupter. The phasing windings 26 are, therefore, adapted to be energized in accordance with the voltage across the open or break contacts of the network switch or circuit breaker.

The voltage windings 27 of the magnetic elements A, B and C have one terminal thereof connected to the terminals T—6, T—12 and T—18, respectively, and the other terminal connected to a common terminal T—2. In practice, the voltage windings 27 may be energized from the respective phases A, B and C of the network in accordance with the network to ground voltage, or between phases, as desired.

The moving contact member 20 is connected to the terminal T—1, the stationary closing contact 21 is connected to the terminal T—7, and the stationary tripping contact 22 is connected to the terminal T—13.

In this particular embodiment, the terminals T—8 and T—14 are not utilized.

In Fig. 4, which is a schematic diagram of what is shown in Figs. 1 and 2, the magnets A, B and C are illustrated as "C" magnets for clearness and, it may be observed, the magnets B and C influence the disc 12, and the magnet A influences the disc 10. The three magnets A, B and C may operate on a common disc or they may operate upon three independent discs, all mechanically connected to control the contact members 20, 21 and 22; but the two-disc system only is illustrated.

The construction of the terminals T—1 to T—18 is shown more in detail in Fig. 5. Referring to this figure of the drawings, the terminal blocks 7, of suitable insulating material, are mounted, as previously stated, on a suitable support, preferably adjacent to the network interrupter which the relay is to control. A plurality of conducting bushings or blocks 30 are mounted in the terminal blocks 7, preferably pressed therein, and screw threaded apertures, two in the present embodiment, are provided in each block 30.

A screw 31, extending through a wall of the terminal block 7, is adapted to cooperate with one of said apertures to maintain the block 30 in operative position and to effect the electrical connection thereof to a lead 32 from the network switch or associated apparatus.

The other threaded aperture in the block 30 communicates with a recess in the front face of the terminal block 7 for the reception of a terminal screw 33 disposed in the terminal chamber 5 of the relay.

Each relay terminal comprises a conducting bushing 34, projecting through an aperture in the base portion 1, and having one end thereof surrounded by a sleeve 35 of insulating material. The outer end of the bushing 34 may be spun-over to engage a washer 36 abutting the end of sleeve 35.

The other end of the bushing 34, disposed in the terminal chamber 5, is provided with interior and exterior screw-threads which are readily accessible from the front of the relay. A plurality of blocks 37, of suitable insulating material, are provided with aligned apertures to closely surround the bushing 34 and are clamped to the base 1 by means of a screw 38 to maintain the bushing 34 in operative position.

The leads from the instrument, such as lead 39, are secured to the respective bushings by means of nuts 40 cooperating with the exterior threads on the bushings.

It is to be understood that the leads to the relay are connected to the bushings when the instrument is assembled, and, when the instrument is mounted for service, these connections need not be disturbed.

The electrical connection of the bushings 34 to the blocks 30 is effected by the elongated terminal screws 33 having a threaded end portion adapted to be received in the threaded aperture in the block 30, and a shank portion of reduced diameter extending through said bushing.

When the instrument is mounted for service, it is only necessary, therefore, to place it against the terminal blocks 7 and insert the screws 33. Electrical connection is thereby effected between the relay and exterior-circuit leads, and the relay is maintained in operative position.

This construction also avoids the possibility of connecting the relay leads incorrectly, and any of the relay circuits may be individually disconnected for testing merely by removing the appropriate terminal screw 33.

It will be noted that the projecting ends of the bushings 34 are received in the recesses formed in the face of the terminal blocks 7. This construction facilitates positioning the relay preparatory to securing it in place, and the parts are so proportioned that there is no possibility of the end of the bushing coming into contact with the exposed face of the block 30. When a screw 33 is removed, therefore, the corresponding circuit to the relay is interrupted.

The terminal construction described is, of course, common to all of the terminals T—1 to T—18. In the present showing, however, the terminals in the lower chamber 5 are mounted in pairs so that only a single set of insulating blocks 37 and a single securing screw 38 are required for each pair of terminals.

The construction of the terminal screw 33 is such that, when it is backed-off sufficiently to disengage the thread in block 30, it cannot be accidentally displaced from the bushing because of the engagement of the threaded portion of the screw with the interior threads of the bushing. This expedient is adopted to prevent loss of the screw 33 when the relay is disconnected. The screw may, of course, be completely removed by further unscrewing movement.

It will be noted that the terminal-block construction shown in Fig. 2 differs from that shown in Fig. 5 in that, in Fig. 2, the threaded apertures in the block 30 are in longitudinal alignment. This is, however, an equivalent construction, and, quite apparently, various other changes may be made in this regard within the scope of the present invention.

The relay contact means shown in Figs. 1 and 2, and in greater detail in Figs. 6, 7, and 8, comprises a rotatable shaft 41 to which is secured a gear wheel 42 mounted for cooperation with a pinion 43 on the main shaft 11 of the relay. The contact 20 is secured to the shaft 41 and will be moved to engage the stationary adjustable contact 21 or the corresponding contact 22 in accordance with the rotation of the relay shaft 11. In the present embodiment, however, the contact 20 is constantly biased for engagement with the contact 21 by a spiral spring 44 so that the contacts 20—21 are closed when the relay windings are deenergized.

The specific construction of the movable contact 20 is shown more clearly in Figs. 7 and 8. It comprises an elongated portion 45 having a collar 46 adjacent to one end thereof for receiving the shaft 41, (shown in Fig. 1) and means 47 for clamping the elongated portion to the shaft and for counter-weighting the contact member. The opposite end of the elongated portion is deformed, as shown in Fig. 7, to provide stops for resilient strips 48 which support the contact surfaces 49.

In Figs. 6 to 10, inclusive, is illustrated a specific reverse-current adjusting means which, in the present instance, is a mechanical means, as distinguished from electrical means employed in the prior art.

With a relay, constructed as above described and having the current, voltage and phasing windings thereof connected to be energized from a polyphase distribution system, as previously pointed out, it is desired to cause the tripping of the network interrupters associated with the various feeders of the system upon the occurrence of reverse-power conditions therein. That is, a feeder should be interrupted when the direction of power therein is from the network to the distribution transformer connected in the feeder.

This function is accomplished by the closure of the contacts 20 and 22 of the relay and it is obviously desirable to so control the closure of these contacts that the magnitude of reverse-current necessary to cause the operation of the relay, and hence, closure of the contacts, may be accurately and adjustably predetermined to meet the operating requirements of the system.

In the present invention, this adjustment is effected by means of a flat spring 50 secured to the elongated portion 45 of the contact 20 for movement therewith. An adjustable stop 51 is mounted in the path of movement of the free end of the spring 50 in such position that, when the relay rotates in response to a reverse-power condition tending to move the contact 20 toward the contact 22, the movement is resisted by the resiliency of the spring 50.

Obviously, by varying the position of the adjustable stop 51, the effective resiliency of the spring 50 for counteracting the movement of the contact 20 may be predetermined.

That is, with the stop 51 in the position shown in Fig. 1, a reverse-energy flow of substantial magnitude is necessary to cause the engagement of the contacts 20, 22, but if the stop is moved to the left of the position shown, a reverse-energy flow of proportionately less magnitude will cause the closure of the contacts. This operation is illustrated more clearly in Figs. 9 and 10. Obviously, the range of adjustment of the reverse-current sensitivity is a wide one, and the adjustment may be accurately set.

Further, the sensitivity of the relay may also be controlled by adjusting the position of the stationary contact 22, or the adjustment may be made by altering the positions of both the contact 22 and the stop 51.

Instead of the flat spring 50 being subjected to a bending action when under deflection, the deflection may be accomplished by a cantilever action of the spring; the object being simply to balance the deflection of a resilient means against the effect of a reverse-current through the relay current windings and thus, broadly, to obtain a mechanical reverse-current adjustment.

Further, it is not necessary that the spring 50 be attached to the moving contact member 20, although this is illustrated as the preferred form. For example, the spring may be secured to the stationary tripping contact 22 and subjected to deflection by an arm carried by the moving contact member 20.

Briefly, the advantages of the polyphase network relay of this invention over the single-phase or single-magnetic-element network relay heretofore used are that it provides a better performance under fault conditions and under unbalanced load conditions, that it is of simpler construction, requires less maintenance, less space and is capable of a more stable operation.

As to the special terminal arrangement or construction, it is apparent that by merely unscrewing the terminal screws, the relay may be disconnected from the network protector, both mechanically and electrically without necessitating the disconnection or reconnection of lead wires and, consequently, avoids the danger of connecting relays incorrectly when replacing them.

The reverse-current adjusting means constructed in accordance with this invention results in a simple and accurate means for accomplishing this adjustment and avoids the use of electrical means, such as auxiliary windings, adjustable resistances and the like, as employed in devices of the prior art.

Such changes and substitutions as may be made by those skilled in the art are to be construed as within the scope of the appended claims, except such limitations as may be imposed by the prior art.

I claim as my invention:

1. A network relay responsive to alternating-current quantities having three electromagnets each energized by a current winding, a phasing winding and a voltage winding, a plurality of induction disc armatures controlled by said electromagnets, a common rotatable shaft for said disc armatures, and closing and tripping contact members controlled by the rotation of said shaft.

2. A polyphase network relay having closing contacts and tripping contacts controlled by a rotatable shaft, a plurality of electromagnetic elements for controlling the direction of rotation of the shaft, said elements severally having a current winding, a phasing winding and a voltage winding.

3. A protective relay for a three-phase distribution network comprising a rotatable shaft having contacts controlled thereby, a pair of spaced induction disc armatures secured to said shaft for rotation therewith, and means for rotating said shaft comprising an electromagnetic element energized from one phase of said network cooperating with one of said discs, and two electromagnetic elements energized, respectively, from the other two phases cooperating with the second disc.

4. A network relay responsive to alternating-current quantities having three electromagnets each energized by a current winding, a phasing winding and a voltage winding, a plurality of induction disc armatures controlled by said electromagnets, a common rotatable shaft for said disc armatures, a moving contact controlled by said shaft, closing and tripping contact members controlled by the rotation of said shaft, and resilient means associated with said shaft and said moving contact and effective only upon movement of said moving contact in one direction for biasing said moving contact in opposition to said movement.

5. A protective relay for a three-phase distribution network comprising a rotatable shaft, a pair of spaced induction disc armatures secured to said shaft for rotation therewith, and means for rotating said shaft comprising an electromagnetic element energized from one phase of said network cooperating with one of said discs, and two electromagnetic elements energized, respectively, from the other two phases cooperating with the second disc, a moving contact controlled by said shaft, closing and tripping contact members controlled by the rotation of said shaft, and resilient means associated with said shaft and said moving contact and effective only upon movement of said moving contact in one direction for biasing said moving contact in opposition to said movement.

6. A protective relay for a three-phase distribution network comprising a rotatable shaft, a pair of spaced induction disc armatures secured to said shaft for rotation therewith, and means for rotating said shaft comprising an electromagnetic element energized from one phase of said network cooperating with one of said discs, and two electromagnetic elements energized, respectively, from the other two phases cooperating with the second disc, a movable contact controlled by said shaft, an adjustably mounted stationary contact for cooperating with said movable contact, resilient means secured to said movable contact for movement therewith, and means for predetermining the sensitivity of said relay comprising said adjustable stationary contact and a stop adjustably mounted in the path of movement of said resilient means.

In testimony whereof, I have hereunto subscribed my name this 14th day of January 1929.

JOHN S. PARSONS.